US012776718B2

(12) United States Patent
Huang et al.

(10) Patent No.: US 12,776,718 B2
(45) Date of Patent: Oct. 27, 2026

(54) SYNCHRONOUS RECTIFIER CIRCUIT POWERED BY A PORTION OF SECONDARY WINDINGS

(71) Applicant: Navitas Semiconductor Limited, Dublin (IE)

(72) Inventors: Xiucheng Huang, Torrance, CA (US); Yun Zhou, Shenzhen (CN); Weijing Du, Torrance, CA (US)

(73) Assignee: Navitas Semiconductor Limited, Dublin (IE)

( * ) Notice: Subject to any disclaimer, the term of this patent is extended or adjusted under 35 U.S.C. 154(b) by 188 days.

(21) Appl. No.: 18/531,617

(22) Filed: Dec. 6, 2023

(65) Prior Publication Data

US 2024/0195312 A1 Jun. 13, 2024

Related U.S. Application Data

(60) Provisional application No. 63/486,942, filed on Feb. 24, 2023.

(30) Foreign Application Priority Data

Dec. 12, 2022 (CN) ......................... 202211598349.0
Dec. 12, 2022 (CN) ......................... 202211600509.0

(51) Int. Cl.
*H02M 3/335* (2006.01)

(52) U.S. Cl.
CPC ............................... *H02M 3/33592* (2013.01)

(58) Field of Classification Search
CPC ............ H02M 3/22; H02M 1/08; H02M 1/36; H02M 3/24; H02M 3/325; H02M 3/335; H02M 3/28; H02M 3/01; H02M 3/33569; H02M 3/33507; H02M 2007/4815; H02M 2007/4818; H02M 1/083; H02M 3/33538; H02M 3/33546; H02M 3/33515; H02M 3/33576; H02M 3/33592; H02M 3/33553; H02M 3/33523; H02M 3/33561; H02M 3/155; H02M 3/1582; H02M 1/4233; H02M 1/12; H02M 3/07; H02M 7/219; H02M 7/4815; H02M 1/0048; H02M 7/4818;

(Continued)

(56) References Cited

U.S. PATENT DOCUMENTS 7,236,041 B2 * 6/2007 Kim ..................... H03K 17/691 327/434
7,791,910 B2 * 9/2010 Pwu .................. H02M 3/33592 363/21.06
10,056,844 B2 * 8/2018 Quaglino ................ G05F 1/468

(Continued)

*Primary Examiner* — Jeffrey A Gblende
(74) *Attorney, Agent, or Firm* — FisherBroyles, LLP

(57) ABSTRACT

A synchronous rectifier circuit is self-powered by a portion of a secondary winding. A transformer has a primary winding arranged to receive power from a power source, a secondary winding arranged to transfer power to a load, and a tapped output arranged to transfer power to a controller circuit, wherein the tapped output is formed from a portion of the secondary windings. The controller circuit uses power from the tapped output to drive a synchronous switch disposed between the secondary winding and the load. The synchronous switch rectifies the power received from the secondary winding such that DC power can be supplied to a load.

18 Claims, 9 Drawing Sheets

(58) Field of Classification Search
CPC .............. H02M 7/4826; H02M 7/4833; Y02B 70/1491
See application file for complete search history.

(56) References Cited

U.S. PATENT DOCUMENTS

| | | | | |
|---|---|---|---|---|
| 10,554,140 | B1 * | 2/2020 | Khamesra | H02M 3/33592 |
| 11,626,808 | B1 * | 4/2023 | Vinciarelli | H02M 1/38 363/17 |
| 2006/0018133 | A1 * | 1/2006 | Hua | H02M 3/33592 363/21.01 |

* cited by examiner

SYNCHRONOUS RECTIFIER CIRCUIT POWERED BY A PORTION OF SECONDARY WINDINGS

CROSS-REFERENCES TO OTHER APPLICATIONS

This application claims priority to U.S. provisional patent application Ser. No. 63/486,942, for "SYNCHRONOUS RECTIFIER CIRCUIT POWERED BY POWER WINDINGS" filed on Feb. 24, 2023, which claims priority to commonly assigned Chinese provisional patent applications Serial No. 202211598349.0, for "SYNCHRONOUS RECTIFIER CIRCUIT POWERED BY POWER WINDINGS," filed on Dec. 12, 2022 and Ser. No. 202211600509.0, for "SYNCHRONOUS RECTIFIER CIRCUIT POWERED BY AUXILIARY WINDINGS," filed on Dec. 12, 2022. This application is also related to the following concurrently filed and commonly assigned U.S. patent application Ser. No. 18/531,619, entitled "POWER CONVERTERS HAVING SYNCHRONOUS RECTIFIER CIRCUITS POWERED BY AUXILIARY WINDINGS," filed Dec. 6, 2023, the contents of all of which are hereby incorporated by reference in their entirety for all purposes.

FIELD

The described embodiments relate to synchronous rectifier power circuits.

BACKGROUND

Synchronous rectifier technology uses a low on-resistance metal oxide semiconductor field effect transistor MOSFET to replace the rectifier diode, which can effectively reduce the conduction loss of the converter. Synchronous rectifier circuits are widely used in switching power supplies to improve efficiency. Although they have a reduced loss in comparison to diode rectifiers they have losses associated with conduction and driving losses

SUMMARY

In some embodiments a power conversion circuit comprises a transformer having a primary winding coupled to a secondary winding, wherein the primary winding is arranged to receive AC power from a power source and wherein the secondary winding is arranged to transfer power to a load, the secondary winding extending between a first terminal and a second terminal and including a tapped output disposed between the first and second terminals. A synchronous switch is disposed between the secondary winding and the load. A controller is arranged to operate the synchronous switch to rectify the power transferred to the load, the controller arranged to receive power from the tapped output.

In some embodiments the synchronous switch is formed from gallium nitride. In various embodiments the controller is formed from silicon. In some embodiments the synchronous switch and the controller are formed from gallium nitride and are monolithically formed on a single die. In various embodiments the power conversion circuit further comprises a diode positioned between the tapped output and the controller. In some embodiments the tapped output includes a fraction of a number of secondary winding turns. In various embodiments the secondary winding includes N turns between the first terminal and the second terminal and wherein the tapped output includes M turns between the first terminal and the tapped output, wherein M is less than N.

In some embodiments a power conversion circuit comprises a transformer having a primary winding arranged to receive power from a power source, a secondary winding arranged to transfer power to a load, and a tapped output arranged to transfer power to a controller circuit, wherein the secondary winding includes N turns between a first terminal and a second terminal and wherein the tapped output is formed from a portion of the secondary winding, the tapped output including M turns between the first terminal and the tapped output, where M is less than N. A synchronous switch disposed between the secondary winding and the load.

In some embodiments the controller circuit is arranged to operate the synchronous switch to rectify the power transferred to the load. In various embodiments the synchronous switch is formed from gallium nitride. In some embodiments the controller is formed from silicon. In various embodiments the synchronous switch and the controller are formed from gallium nitride and are monolithically formed on a single die. In some embodiments the conversion circuit further comprises a diode positioned between the tapped output and the controller circuit.

In some embodiments a method of operating a rectification circuit comprises receiving AC power at a primary winding of a transformer, coupling power from the primary winding of the transformer to a secondary winding of the transformer and rectifying power received from the secondary winding with a switch and transferring DC power to a load, wherein the switch is operated by a controller that receives power from a portion of the secondary winding.

In some embodiments the method further comprises receiving power at the controller from a tapped output of the secondary winding, wherein the secondary winding includes N turns between a first terminal and a second terminal and wherein the tapped output includes M turns between the first terminal and the tapped output, where M is less than N. In various embodiments the method further comprises a diode positioned between the tapped output and the controller circuit, the diode arranged to rectify power transferred to the controller. In some embodiments the synchronous switch is formed from gallium nitride. In various embodiments the controller is formed from silicon. In some embodiments the synchronous switch and the controller are formed from gallium nitride and are monolithically formed on a single die. In some embodiments the synchronous switch and the controller are co-packaged in a single electronic package.

To better understand the nature and advantages of the present disclosure, reference should be made to the following description and the accompanying figures. It is to be understood, however, that each of the figures is provided for the purpose of illustration only and is not intended as a definition of the limits of the scope of the present disclosure. Also, as a general rule, and unless it is evident to the contrary from the description, where elements in different figures use identical reference numbers, the elements are generally either identical or at least similar in function or purpose.

DETAILED DESCRIPTION

Figure 1:
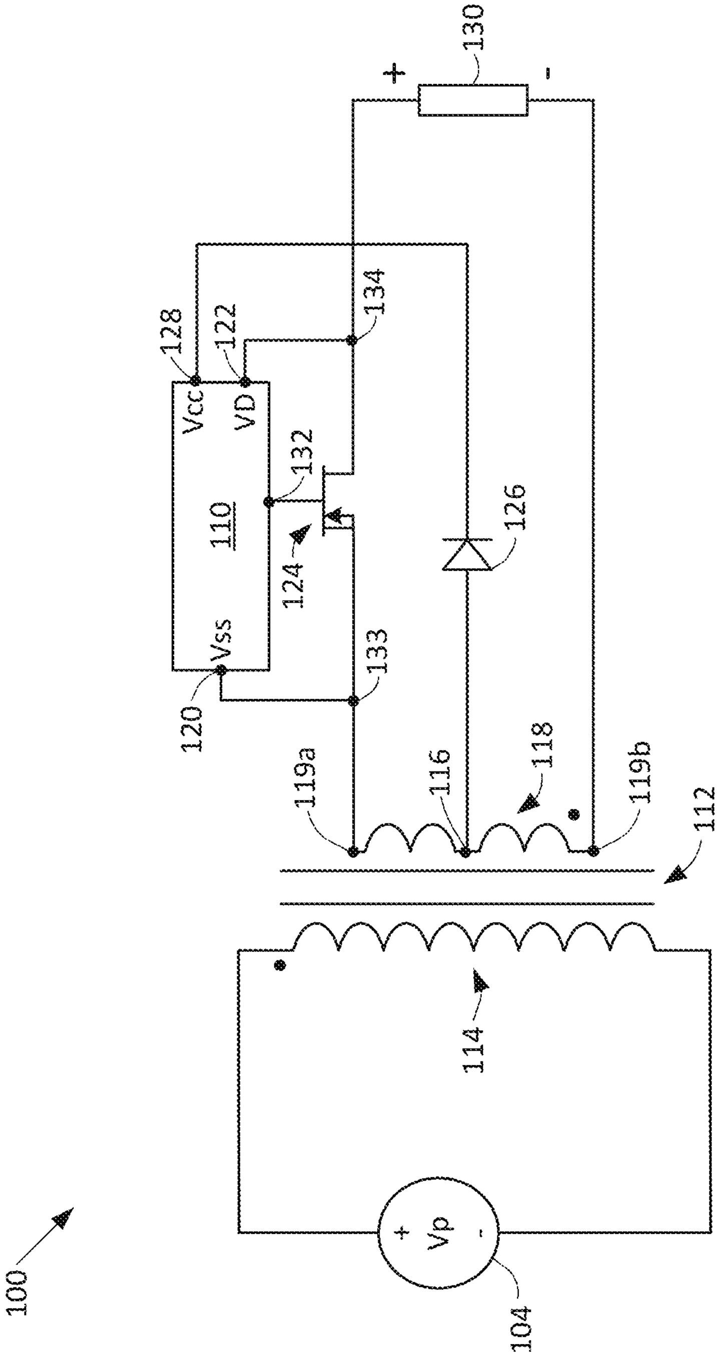
FIG. 1 Shows a simplified schematic of a synchronous power converter with a synchronous rectifier controller powered by a portion of a secondary winding.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques disclosed herein relate generally to synchronous rectifier circuits. More specifically, techniques disclosed herein relate to self-powered synchronous rectifier circuits that operate with improved efficiency and have lower cost as compared to traditional synchronous rectifier circuits. Various inventive embodiments are described herein, including methods, processes, systems, devices, and the like.

For example, in some embodiments an AC source powers a primary winding of a transformer that couples energy to a secondary winding of the transformer according to a turns ratio of the number of primary turns to the number of secondary turns. A synchronous control circuit is powered from a tapped output off of the secondary winding where a voltage from the tapped output is less than a voltage across the secondary winding. The synchronous control circuit powers a synchronous switch that turns on and off to rectify the output of the secondary winding such that a DC voltage can be supplied to a load. The tapped output off of the secondary winding is more cost-efficient than providing an auxiliary winding to power the synchronous control circuit and provides improved control of the voltage supplied to the synchronous control circuit such that the switch can be driven efficiently.

In order to better appreciate the features and aspects of the present disclosure, further context for the disclosure is provided in the following section by discussing one particular implementation of a self-powered synchronous rectifier circuit that is powered off a portion of a secondary transformer winding according to embodiments of the disclosure. These embodiments are for explanatory purposes only and other embodiments may be employed in other types of circuits and/or electronic devices. For example, embodiments of the disclosure can be used with any type of circuit that converts power including but not limited to: flyback converters, active clam flyback converters, dual-tube flyback converters, asymmetric half-bridges, forward converters, dual-tube forward converters and LLC converters. In some instances, embodiments of the disclosure are particularly well suited for use with fast chargers the convert AC power to DC power for charging one or more electronic devices because of their potentially small form factor, low-cost and high efficiency.

Several illustrative embodiments will now be described with respect to the accompanying drawings, which form a part hereof. The ensuing description provides embodiment (s) only and is not intended to limit the scope, applicability, or configuration of the disclosure. Rather, the ensuing description of the embodiment(s) will provide those skilled in the art with an enabling description for implementing one or more embodiments. It is understood that various changes may be made in the function and arrangement of elements without departing from the spirit and scope of this disclosure. In the following description, for the purposes of explanation, specific details are set forth in order to provide a thorough understanding of certain inventive embodiments. However, it will be apparent that various embodiments may be practiced without these specific details. The figures and description are not intended to be restrictive. The word "example" or "exemplary" is used herein to mean "serving as an example, instance, or illustration." Any embodiment or design described herein as "exemplary" or "example" is not necessarily to be construed as preferred or advantageous over other embodiments or designs.

FIG. 1 shows a simplified schematic of a synchronous power converter 100 that includes a synchronous rectifier control circuit (SRCC) 110 powered by a tapped transformer winding, according to embodiments of the disclosure. As shown in FIG. 1, transformer 112 includes a primary input winding 114 having Np turns and an output winding 118 having Ns turns extending between a first terminal **119*a* and a second terminal 119*b*. Input winding 114 receives energy from an input AC voltage source Vp 104 and transfers energy to output winding 118** where a voltage across the output winding is proportional to a ratio of the number of primary turns Np to the number of output winding turns Ns.

Output winding 118 has an alternating voltage that is coupled to a load 130 via a synchronous switch 124 that turns on and off to rectify the voltage supplied by the output winding such that the load receives a DC voltage. The synchronous switch 124 is controlled by the SRCC 110 that is "self-powered" by the transformer 112. More specifically output winding 118 includes a tapped output terminal 116 that includes a portion of the number of turns Ns of the output winding 118. Thus, a voltage at the tapped output terminal 116 is less than the voltage across the secondary winding 118. The tapped output terminal 116 is connected to a Vcc terminal 128 of the SRCC 110 via a diode 126. The SR 110 also includes a Vss terminal 120 connected to first terminal **119*a* of output winding 118 and a VD terminal 122 connected to load 130 where the synchronous switch 124 has a source terminal 133 coupled to the first terminal 119*a* and a drain terminal 134 coupled to the load 130. The SRCC 110 controls the synchronous switch 124 via gate terminal 132**.

As described above, tapped output terminal 116 includes a portion of the number of turns of the secondary winding 118 and includes Nto turns. The voltage supplied to the Vcc terminal 128 by the tapped output terminal 116 is the ratio of the number of turns of the tapped output Nto divided by the number of turns of the primary winding Np times the input voltage Vp.

$$Vcc = \left(\frac{Nto}{Np}\right)Vp$$

The voltage at tapped output terminal 116 will be lower voltage than the voltage across the secondary winding 118. The voltage at the tapped output terminal 116 is rectified by the diode 126 and drives the Vcc terminal 128 of the SRCC 110.

The transformer 112 has an inverted polarity such that when the input voltage Vp 104 is positive the voltage across the output winding 118 is negative. Similarly, the voltage at output tap 116 is also negative, however it has a higher voltage than the Vss 120 connection of the SRCC 110. The diode 126 will be forward biased since the anode is positive with respect to the cathode generating the voltage Vcc 128 input to the SRCC 110. When the input voltage Vp 104 is negative the output of the tapped output 116 will be positive and the diode 126 will be reverse biased. The synchronous switch 124 will be in an on state and the full voltage of the secondary winding 118 will be present at the load 130.

In some embodiments the synchronous switch 124 is a semiconductor switch formed from silicon, gallium nitride, silicon carbide, gallium arsenide, diamond or other suitable semiconductor material. In various embodiments the synchronous switch 124 is a MOSFET, a HEMT, a PHEMT or other suitable type of semiconductor device.

In some embodiments the SRCC 110 is a semiconductor circuit formed from silicon, gallium nitride, silicon carbide, gallium arsenide, diamond or other suitable semiconductor material. In various embodiments the synchronous switch 125 is made from gallium nitride and the SRCC 110 is made from silicon. In other embodiments the synchronous switch 125 is made from gallium nitride and the SRCC 110 is made from gallium nitride. In some embodiments the synchronous switch 125 is made from gallium nitride and is monolithically formed on a single die with the SRCC 110 which is also made from gallium nitride. In various embodiments the synchronous switch 125 is formed on a first die and co-packaged with the SRCC 110 that is formed on a second die.

Figure 2:
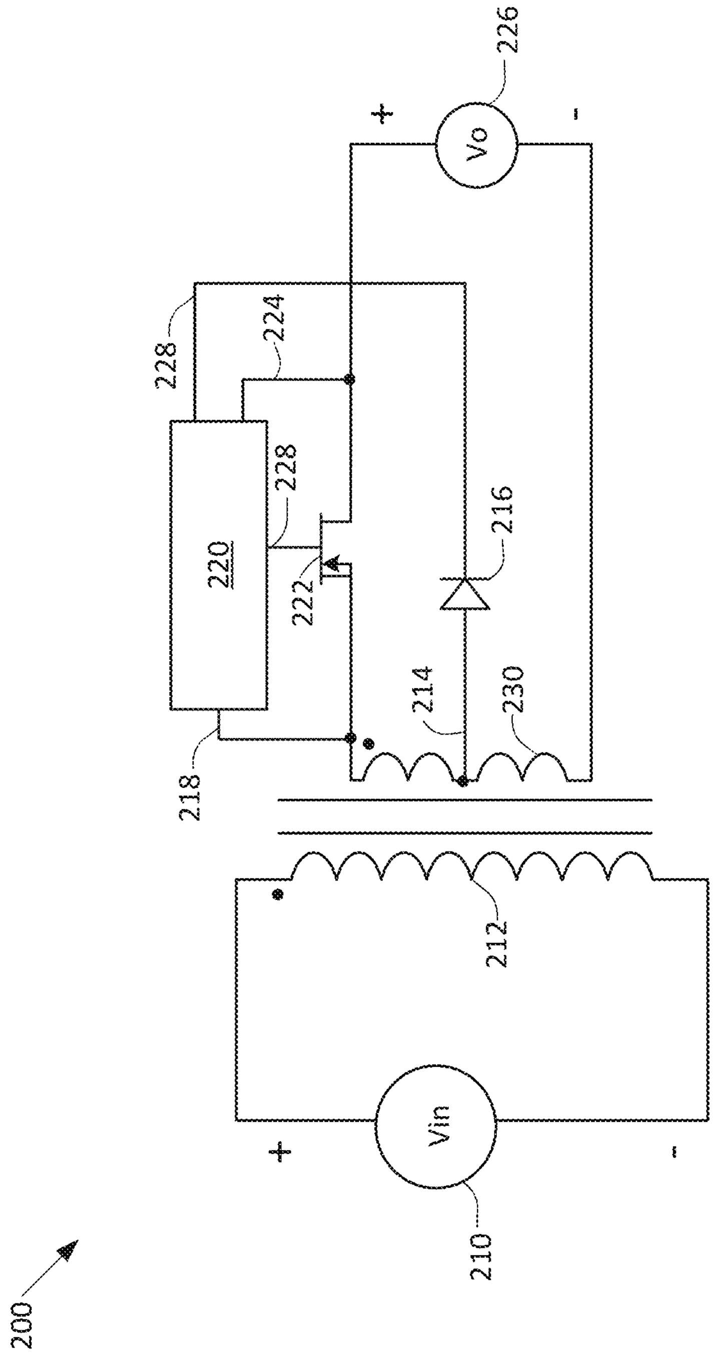
FIG. 2 shows a simplified schematic of a synchronous rectifier circuit that is similar to FIG. 1 wherein the secondary winding is positive when the input voltage is positive.

FIG. 2 shows a simplified schematic of a synchronous rectifier circuit 200 that is similar to the synchronous rectifier circuit 100 shown in FIG. 1, however in this embodiment the polarity of the secondary winding is the same as the polarity of the primary winding, as described in more detail below. As shown in FIG. 2, synchronous rectifier circuit 200 may be a forward converter and may be or include any of the components, features, or characteristics of any of the rectifier circuits described herein. An input voltage Vin 210 drives the primary winding 212 of a transformer with Np number of windings. The secondary winding 230 has Ns number of windings and has a tapped output 214. The top of the secondary winding 230 is connected to the Vs 218 input of the SRCC 220. It is also connected to the source of synchronous switch 222. The drain of synchronous switch 222 is connected to the Vd 224 input to the SRC 220 and is also connected to the positive rail of Vo 226. The synchronous switch is controlled by the Vg 228 output of the SRC 220. The tap 214 is connected to the anode of diode 216. The cathode of diode 216 is connected to the Vcc 228 input of the SRC 220. The bottom of the secondary winding 230 is connected to the negative rail of Vo 226.

In contrast to FIG. 1 when Vin 210 is positive the diode 216 is reverse biased. The tap voltage 214 is lower than the reference voltage Vs 218. When the synchronous switch 222 is closed the output voltage Vo 226 is driven by the secondary 230. When the input is negative the tap 214 forward biases the anode of diode 216. The diode half wave rectifies the tap voltage 214 and generates Vcc 228 for the SRCC 220.

Figure 3:
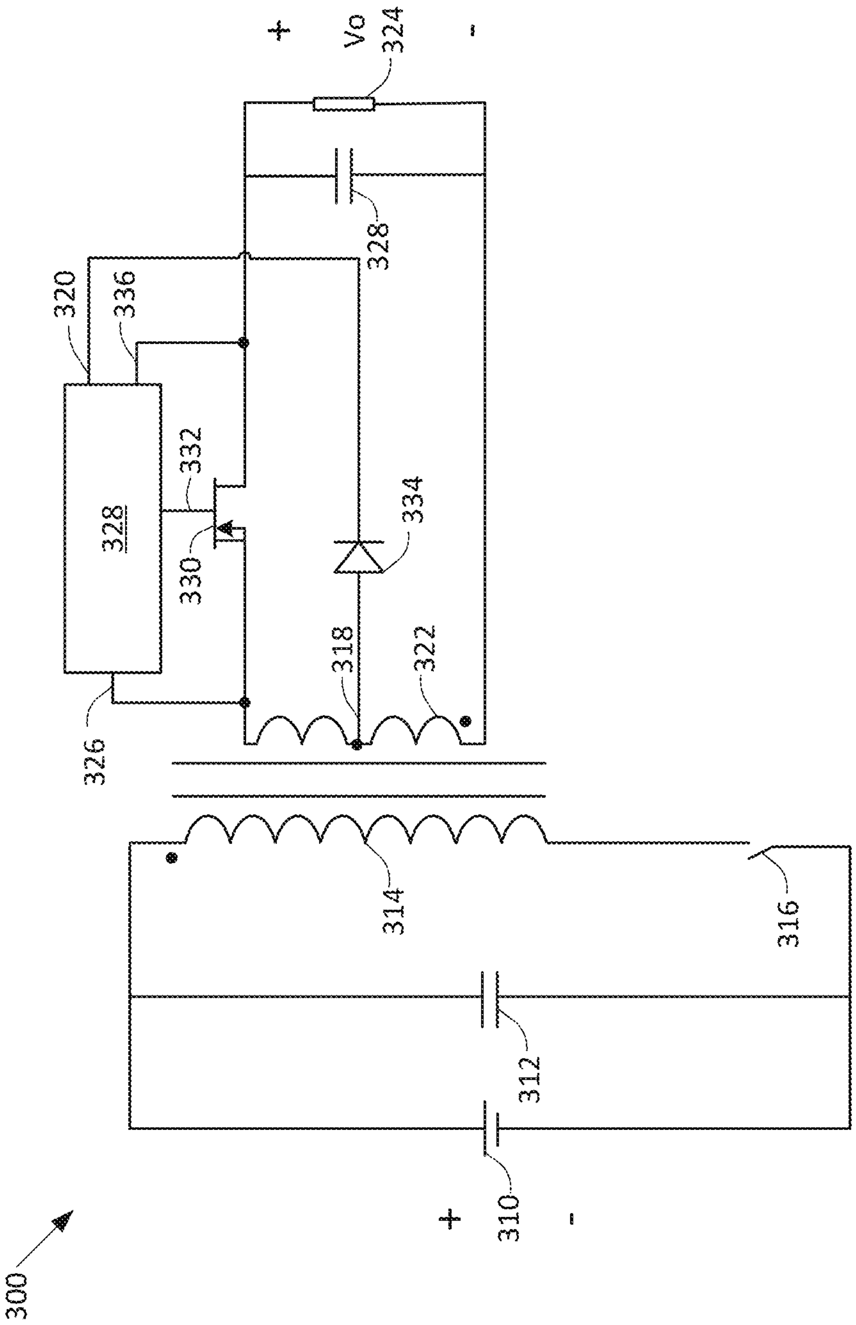
FIG. 3 shows a schematic for a synchronous converter configured as a flyback converter with a synchronous rectifier controller powered by a portion of a secondary winding.

FIG. 3 shows a simplified schematic of a synchronous rectifier circuit 300. As shown in FIG. 3, synchronous rectifier circuit 300 may be a flyback converter and may be or include any of the components, features, or characteristics of any of the rectifier circuits described herein. Synchronous rectifier circuit includes an input voltage source Vin 310 in parallel with input capacitance 312. A plus rail of Vin 310 is connected to the top of primary winding 314. A bottom of primary winding 314 is connected to the top of switch 316. The bottom of switch 316 is connected to the negative rail of VIN 310. The secondary 322 of the transformer has a tap 318 that is connected to the secondary a small number of windings from the end of the secondary winding. The voltage generated at the tap is small with respect to the voltage of the full secondary. The tap 318 is connected to the anode of a diode 334. The cathode of diode 334 is connected to the Vcc 320 input of the SRCC 328. The top of the secondary winding 322 is connected to the Vss 326 input of the SRCC 328 and is also connected to the source of synchronous switch 330. The drain of synchronous switch 330 is connected to the Vd 336 input of the SRCC 328 and the positive rail of Vo 324. Vo 324 is in parallel with the output capacitor 328. The bottom of secondary winding 322 is connected to the negative rail of Vo 324.

The transformer may be configured as a flyback transformer that stores energy though a first half cycle and releases it in a second half cycle. A flyback transformer stores energy in its primary winding magnetics and releases it through the secondary. In this way a flyback transformer operates as a pair of coupled inductors. When the input Vin 310 goes positive the switch 316 closes and charges both the mutual inductance and the leakage inductance of the primary winding 314. During this period the diode 334 is forward biased because the voltage of the tap 318 is higher than the voltage of the SRCC 328 reference node Vss 326. The diode produces a half wave rectified voltage Vcc 320 powering the SRCC 328 controller circuit. When Vin 310 becomes negative, the switch 316 is opened. The secondary 322 becomes positive while the primary windings 314 stored energy discharges. The stored energy is output through the secondary 322. The secondary becoming positive reverse biases the diode 334. The synchronous switch 330 closes when the switch 316 is opened so that power flows from the secondary to the output. It is important that the switch 316 and synchronous switch 330 operate in a complementary fashion. When 316 is closed synchronous switch 330 is open and when 316 is closed synchronous switch 330 is open. When the synchronous switch 330 is closed the output voltage Vo 324 in parallel with the output capacitance 328 is equal to the voltage across the entire secondary winding Ns 322.

By using a synchronous rectifier for its output, the losses associated with a diode rectification are replaced by the on resistance of the synchronous switch 330 and its driving loss. The driving loss is significantly reduced by the use of the tap 318 to produce a low voltage Vcc 320 magnitude.

Figure 4:
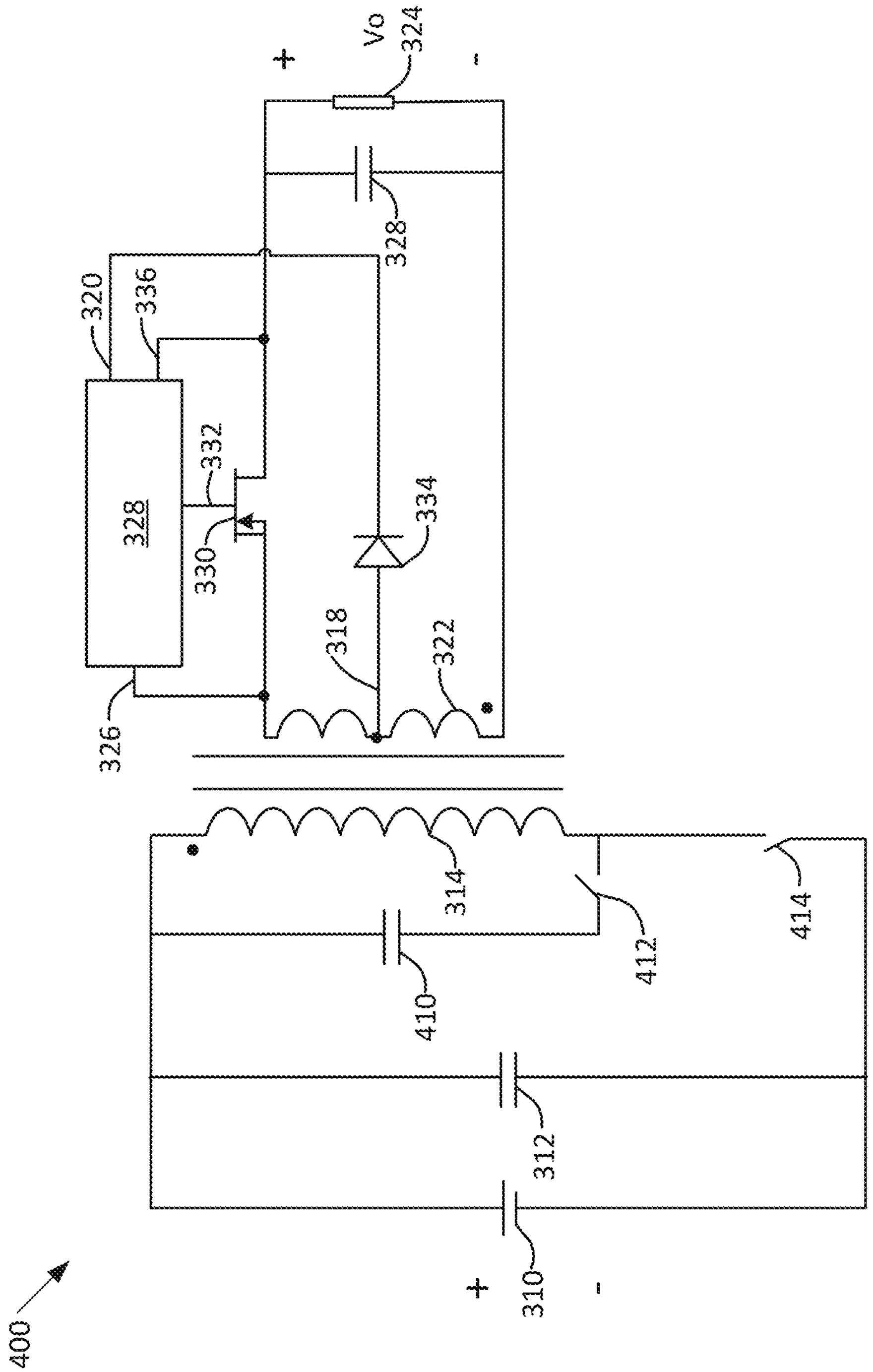
FIG. 4 Shows the flyback converter similar to the converter of FIG. 3 with an additional clamp capacitor and switch.

FIG. 4 shows a simplified schematic of a flyback converter circuit 400, according to embodiments of the disclosure. Flyback converter circuit 400 is similar to the converter circuit 300 shown in FIG. 3 however converter circuit 400 has an additional clamp capacitor 410 and switch 412. Flyback converter circuit 400 may be or include any of the components, features, or characteristics of any of the rectifier circuits described herein. More specifically, switch 414 replaces the switch 316 of FIG. 3. Switch 414 connects the base of the primary winding to the negative rail of Vin 310. There is a capacitor 410 in series with a second switch 412. The capacitor 410 and switch 412 series combination is in parallel with the primary winding 314.

Flyback converter circuit 400 operates in a manner similar to the converter circuit 300 of FIG. 3. The circuit input power source 310 can be an AC or DC power source. It has an input capacitance 312 in parallel with Vin 310. The top of the primary winding 314 is connected to the positive rail of Vin 310. The bottom of the primary winding 314 is connected to the top of the switch 414. The bottom of the switch 414 is connected to the negative rail of Vin 310. The top of a clamp capacitor 410 is connected to the top of the primary winding 314. The bottom of the clamp capacitor 410 is connected to one side of a switch 412. The other side of the switch 412 is connected to the bottom of primary winding 314. The secondary winding 322 has Ns windings and has a tapped output 318. The tapped output is connected to the secondary 322 with a small number of turns Nto between the tap and one end of the secondary 322. The top of the secondary winding 322 is connected to 326 Vd of SRCC 328 and is also connected the source of synchronous switch 330. The drain of synchronous switch 330 is connected to the 336 Vss input of the SRCC 328 and is connected to the positive rail of capacitor 328 and the positive rail of Vout 324. The output Vout 324 drives a load in parallel with the output capacitance of 328. The tap 318 is connected to the anode of a diode 334. The cathode of diode 334 is connected to 320 Vcc input of the SRCC 328. The bottom of the secondary winding 322 is connected to the negative rail of Vout 328 and Cout 328.

While the input source is positive, the switch 414 closes. When the switch 414 closes the primary winding 314 stores energy by ramping the current of the primary winding magnetics. The primary winding magnetics consists of its coupling inductance and a leakage inductance. During this period the secondary winding 322 is negative. The tap 318 voltage is positive with respect to the SRCC 328 common node 326 Vd and forward biases the diode 334. The diode 334 half-wave rectifies the voltage at the tap to produce the voltage input Vcc 320 of the SRCC 328. While the switch 414 remains closed, the switch 412 and synchronous switch 330 are open. When the switch 414 is opened, the primary 314 winding discharges through the secondary 322. The energy stored in the mutual inductance is transferred to the secondary. However, the energy stored in the leakage inductance can be lost. The clamp capacitance 410 is used to recapture the energy of the leakage inductance. When switch 414 opens switch 412 closes so that the energy stored in the leakage inductance is that stored in the capacitor. It also has a smoothing effect of the voltage across the switch. The synchronous switch 330 is controlled by the Vg 332 output of the SRCC 328.

Figure 5:
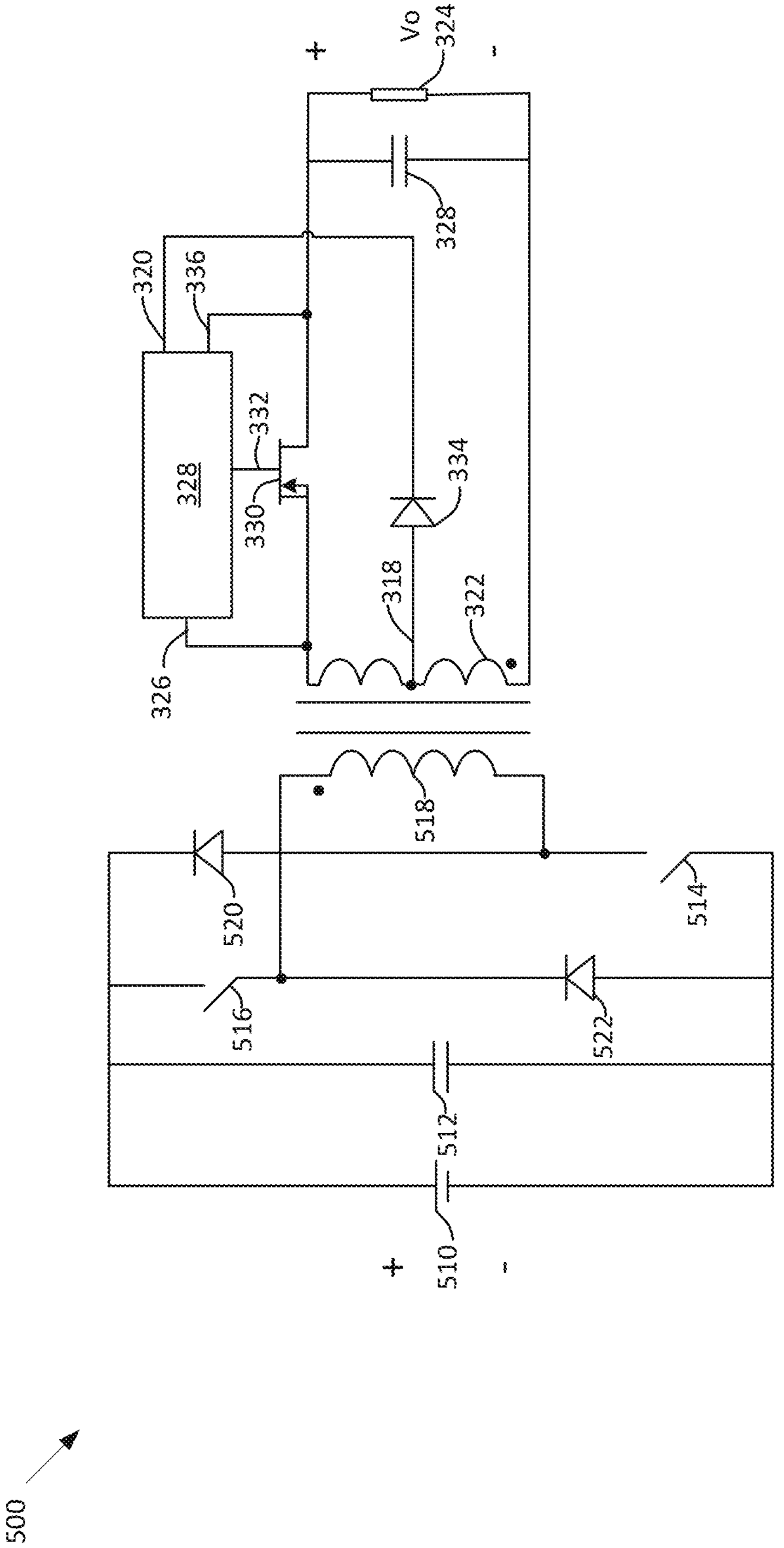
FIG. 5 shows a circuit that is a double-tube flyback converter with a synchronous rectifier controller powered by a portion of a secondary winding.

FIG. 5 shows a simplified schematic of a double-tube flyback converter circuit 500, according to embodiments of the disclosure. Double-tube flyback converter circuit 500 may be or include any of the components, features, or characteristics of any of the rectifier circuits described herein. As shown in FIG. 5, converter circuit 500 includes an input voltage 510, an input capacitance 512 and two switches, namely 514 and 516. The top of switch 514 is connected to the bottom of the primary winding 518. The bottom of switch 514 is connected to the negative rail of Vin 510. The bottom of primary winding 518 is also connected to the anode diode 520. The cathode of diode 520 is connected to the positive side of Vin 510. The bottom of switch 516 is connected to the cathode of diode 522. The Cathode of diode 522 is also connected to the top of primary winding 518. The anode of diode 522 is connected to the negative rail of Vin 510. The top of switch 516 is connected to the positive rail of Vin 510. The winding 518 is the primary winding of a flyback transformer.

The secondary 322 has Ns windings and has a tapped output 318 that connects to the secondary a number of windings from the end. The voltage across the tapped output 318 is lower than a voltage across the entire secondary winding 322. The top of the secondary 322 is connected to the common point 326 Vss of the SRCC 328 and is also connected to the source of synchronous switch 330. The tap 318 is connected to the anode of diode 334. The cathode of diode 324 is connected to the Vcc 320 input of the SRCC 328. The drain of synchronous switch 330 is connected to the Vdd 336 input of the SRCC 328 and is connected to the positive rail of Vout 324. Vout is in parallel with the output capacitor 328. Switch 330 is controlled by the Vg output 332 of the SRCC 328.

The switches 514 and 516 close connecting the winding 518 across Vin 510. The inductances of the primary winding 518 store energy ramping up the magnetic flux. The diode 334 is forward biased producing a half wave rectified Vcc 320 and the synchronous switch 330 is open. Switches 514 and 516 open when the magnetization reaches a desired level. The energy stored in the magnetization inductance of the primary winding 518 drains into the secondary winding 322. The secondary winding 322 changes polarity reverse biasing diode 334. The full voltage of the secondary drives Vo 324. When the switches 514 and 516 open the voltage at each side of the winding is clamped to within one diode drop of the rails of Vin 510 relieving the stress across switches 514 and 516.

Figure 6:
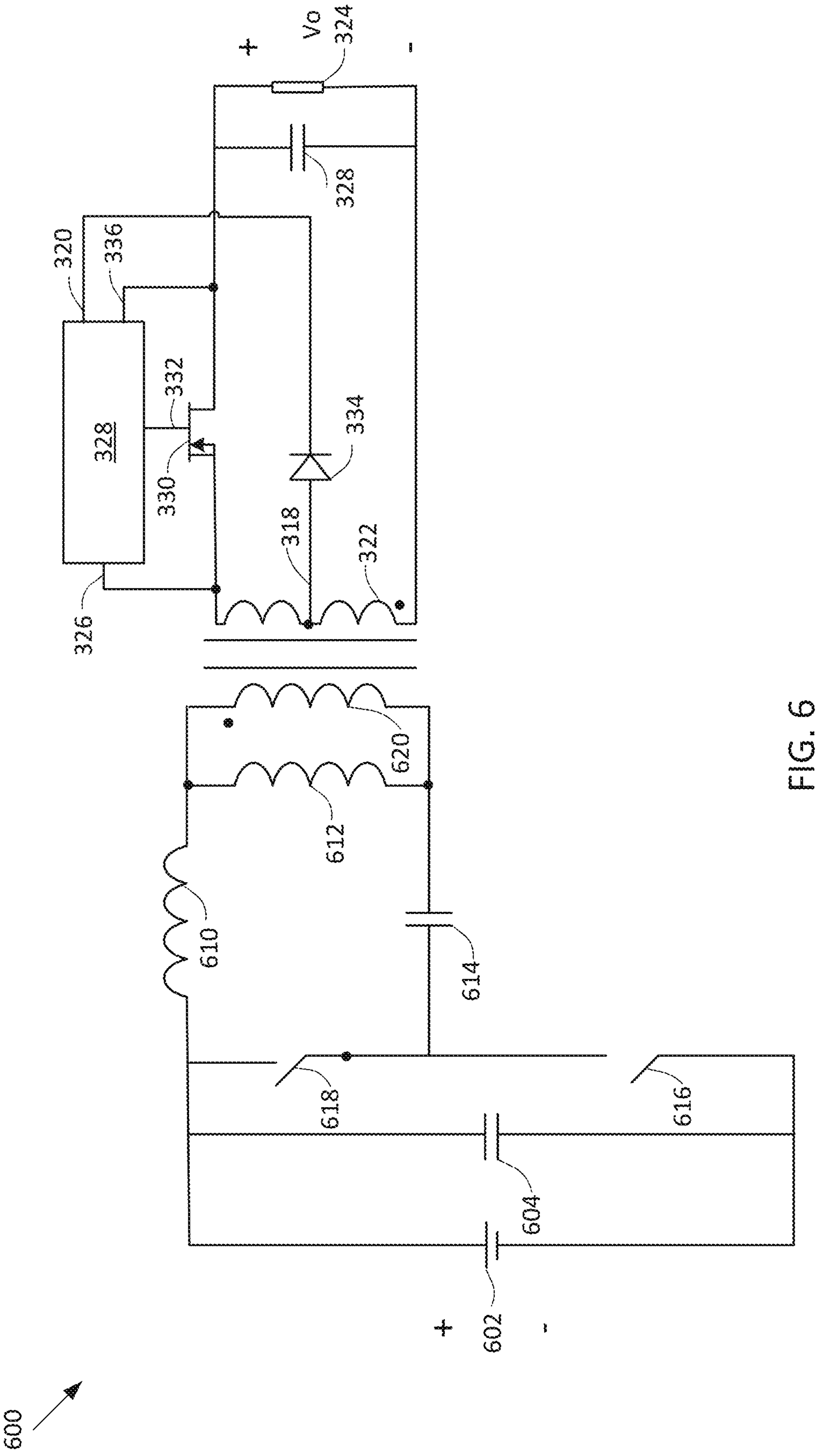
FIG. 6 is a schematic of a circuit of an asymmetric half-bridge converter with a synchronous rectifier controller powered by a portion of a secondary winding.

FIG. 6 is a schematic of a circuit of an asymmetric half-bridge converter circuit 600, according to embodiments of the disclosure. Asymmetric half-bridge converter 600 may be or include any of the components, features, or characteristics of any of the rectifier circuits described herein. As shown in FIG. 6, asymmetric half-bridge converter 600 consists of an input voltage Vin 602 in parallel with an input capacitance 604. A switch 616 is in series with a switch 618 across the input. Switch 618 is connected on the top to an inductor 610 and to the plus rail of 602. The opposite side of inductor 610 is connected to top of inductor 612 which is in parallel with the primary winding 620. The bottom of inductor the 612 and 620 parallel combination is connected to one side of capacitor 614. The opposite side of capacitor 614 is connected to the bottom of switch 618 and is connected to the top of switch 616. The bottom of switch 616 is connected to the negative rail of 602 and 604. The secondary 322 has Ns windings and has a tap 318. The tapped output 318 is connected to the secondary with a reduced number of windings Nto to the edge of the secondary. The tapped output 318 produces a smaller voltage than the entire secondary output and is connected to the anode of diode 334. The cathode of 334 is connected to the Vcc 320 input of the SRCC 328. The top of the secondary is connected to the common point Vss 326 of the SRCC 328 and is also connected to the source of synchronous switch 330. The synchronous switch 330 is controlled by the Vg 332 output of the SRCC 328. The drain of synchronous switch 330 is connected to the output Vo 324 as well as the output capacitance 328. The other end of the secondary winding is connected to the minus side of Vo 324.

Asymmetric half-bridge converter circuit 600 operates as a resonant converter and uses inductance 610, and 612 along with capacitance 614. The inductor 612 represents the inductance of the primary winding 620. The circuit has an input voltage 602 and a parallel input capacitance 604. The cycle begins with closing of switch 616 which charges the resonant input circuit. The diode 334 is forward biased, and the synchronous switch 330 and switch 618 are open. The switch 616 is then opened and switch 618 is closed and the current circulates through the resonant circuit. When switch 618 is closed the energy from the resonant circuit is transferred though the magnetics to reverse bias the diode 334. The synchronous switch 330 is closed so that the full voltage of the secondary is applied to the output voltage Vo 324. This is a general description of the operation of the circuit in FIG. 6. And there are myriad other ways the voltages and the resonant circuits may be controlled, and this embodiment is not limited to the described operational sequence. The use of a switchable element on the output to rectify the output of the secondary with an asymmetric half bridge converter drive allows a higher efficiency of the converter.

Figure 7:
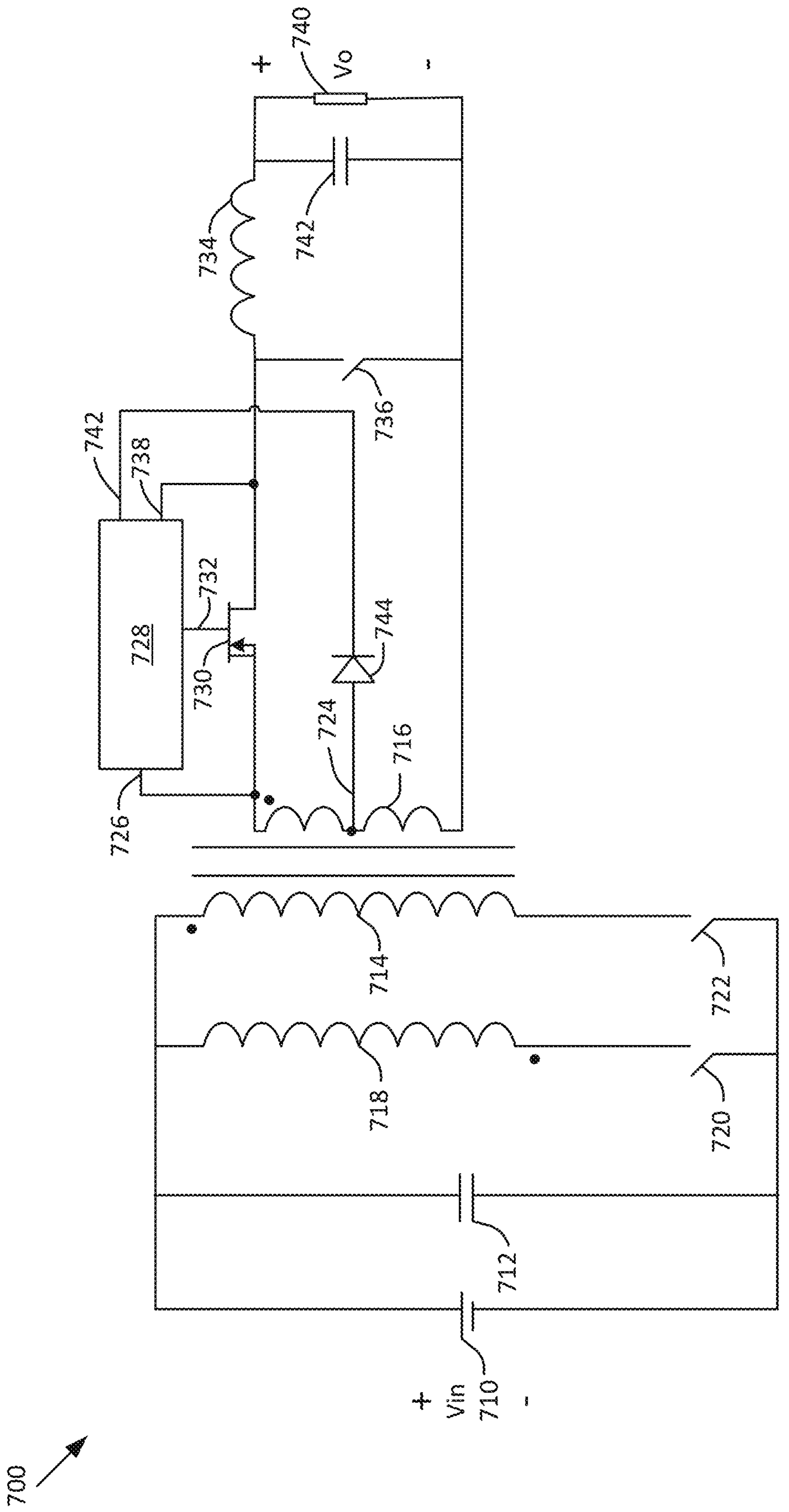
FIG. 7 is a schematic of a forward converter with a synchronous rectifier controller powered by a portion of a secondary winding.

FIG. 7 is a simplified schematic of a forward converter circuit 700, according to embodiments of the disclosure. Forward converter circuit 700 may be or include any of the components, features, or characteristics of any of the rectifier circuits described herein. As shown in FIG. 5, forward converter circuit 700 has an input Vin 710 with an input capacitance 712 and a transformer with a primary winding 714 and a secondary winding 716. There is also a tertiary winding 718 which is closely coupled to the primary winding. The tertiary winding 718 is in series with a switch 720, and the primary winding 714 is in series with a switch 722. The secondary winding 716 has a tap 724 that is electrically connected to secondary with reduced number of windings Nto from the edge so that it can produce a smaller voltage than that of the entire secondary winding. The transformer is wired so that the polarity of the secondary is the same as the polarity of the primary. The top of the secondary 716 is connected to the input 726 Vss of the SRCC 728 and is also connected to the source of synchronous switch 730 that is controlled by the output Vg 732 of the SRCC 728. The drain of synchronous switch 730 is connected to one end of inductor 734 and is connected to and the input Vd 738 of the SRCC 728 and to the top of switch 736. The other end of inductor 734 is connected to the positive rail of Vo 740 and the output capacitor 742. The bottom of the secondary 716 is connected to the bottom of switch 736 and the negative side of output voltage Vo 740 and the output capacitor 742. The tap 744 of the secondary is connected to the anode of diode 744. The cathode of diode 744 is connected to the Vcc in 742 of the SRCC 728.

Forward converter circuit 700 operates by the switch 722 closes causing current to flow through the primary winding 714. The transformer causes current to flow through the secondary winding also. This causes the diode 744 to reverse bias. The synchronous switch 730 is shorted to allow the full voltage of the secondary to cause current to flow through inductor 734 to ramp its current producing an output voltage Vo. Switch 736 is open. When the switch 722 is opened the synchronous switch 730 is also open. Switch 736 is closed as a free-wheeling device so that the inductor 734 can continue to conduct current as it slowly decays. Switch 720 is closed so that the energy in the leakage inductance of the primary winding can be dissipated through the winding 718. This protects the switch from a voltage stress due to the opening of switch 722. The diode 744 is forward biased producing a voltage which powers the Vcc 742 input of the SRCC 728 electronics.

Figure 8:
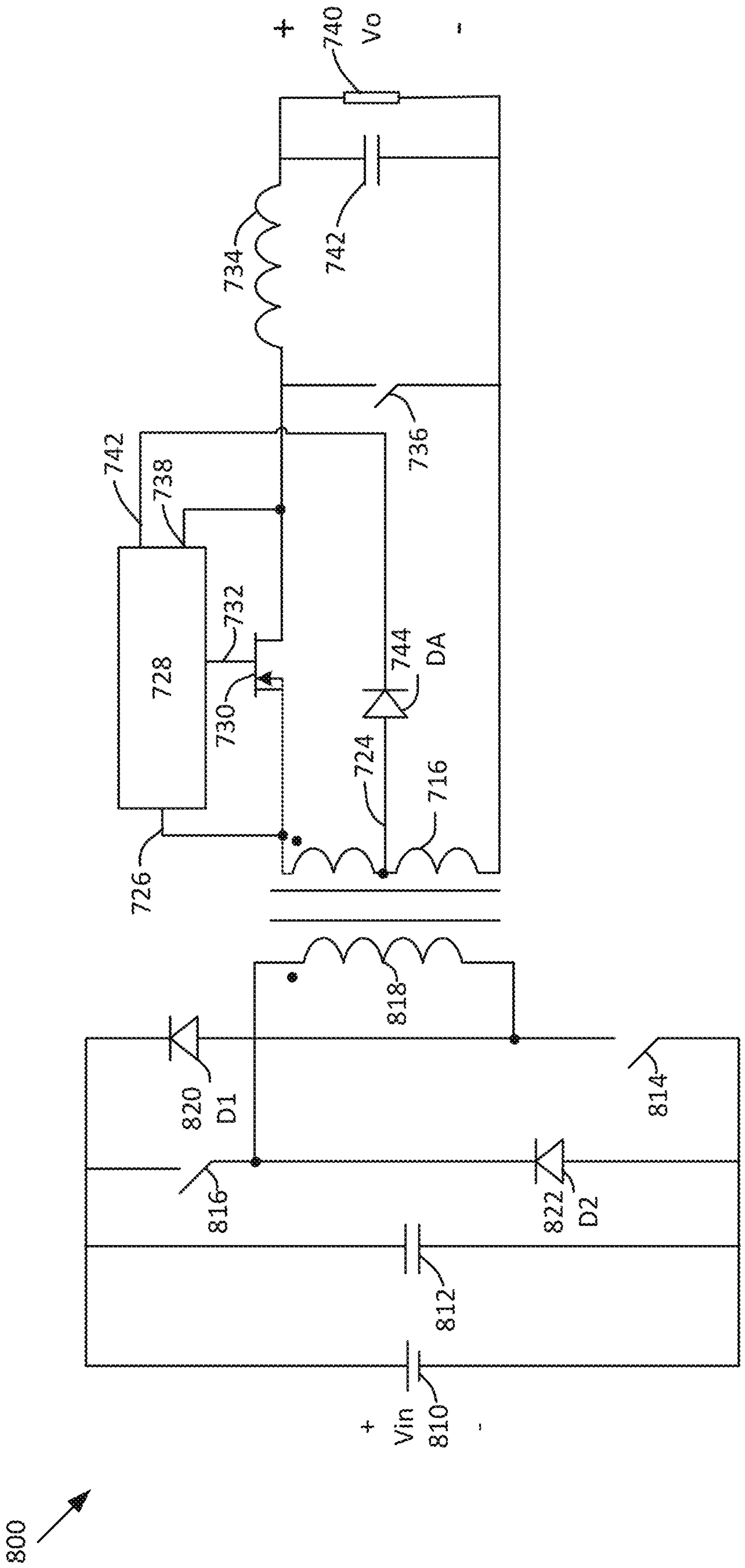
FIG. 8 shows the schematic for a double tube forward converter with a synchronous rectifier controller powered by a portion of a secondary winding.

FIG. 8 shows a simplified schematic of a double tube forward converter with a synchronous rectifier output 800, according to embodiments of the disclosure. Converter circuit 800 may be or include any of the components, features, or characteristics of any of the rectifier circuits described herein. As shown in FIG. 8, converter circuit 800 has an input voltage Vin 810 in parallel with an input capacitance 812 and two switches, namely 814 and 816. The top of switch 814 is connected to the bottom of the primary winding 818 and the bottom of switch 814 connected to the minus side of Vin 810 and capacitor 812. The bottom of the primary winding 818 is also connected to the anode diode D1 820. The cathode of diode D1 820 is connected to the positive side of Vin 810 and capacitor 812. The bottom of switch 816 is connected to the top side of primary winding 818 and is also connected to the cathode of diode D2 822. The anode of diode D2 822 is connected to the minus side of Vin 810 and 812. The top of switch 816 is also connected to the positive side of Vin 810 and capacitor 812. The secondary 716 has the same polarity of the primary winding. The secondary 716 has Ns windings and has a tapped output 724. The tapped output 724 connects to the secondary 716 with a reduced number of windings Nto from the end of the winding 716. The tapped output 724 is connected to the anode of diode 744. The cathode of diode DA 744 is connected to the input Vcc 742 of the SRCC 728. The top of secondary 716 is connected to the common point Vss 726 of the SRCC 728 and is also connected to the source of synchronous switch 730. The drain of synchronous switch 730 is connected to the Vss 738 input of the SRCC 728 and is connected to one side of inductor 734 as well as the top of switch 736. The other side of inductor 734 is connected to the positive rail of Vo 740 and output capacitor 742. The bottom of secondary 716 is connected to the bottom of switch 736 and the negative rail of capacitor 742 and Vo 740. The synchronous switch 730 is controlled by the Vg 732 output of the SRCC 728.

The converter circuit 800 operates by switch 814 and switch 816 closing allowing the input voltage to cause current to flow in the primary winding 818. The transformer is designed so that when the input to the primary winding is positive the output of the secondary winding is also positive which reverse biases the diode 744. The synchronous switch 730 is closed by the gate drive 732. The voltage output of the secondary charges the inductor 734 and supplies the output voltage Vo 740. Switch 736 is open. When the switches 814 and 816 open the voltage stress is applied over the two switches reducing the stress than it would be with just one switch. When switches 816 and 814 open the diodes D1 820 and D2 822 clamp the voltage on the switches to be within one diode drop of each rail. When switch 814 and switch 816 open the synchronous switch 730 opens and switch 736 closes. Switch 736 closes to allow the inductor to continue to conduct current as a freewheeling device without the associated diode voltage drop. The diode DA 744 forward biases and supplies the voltage Vcc 742 to power the SRCC electronics.

Figure 9:
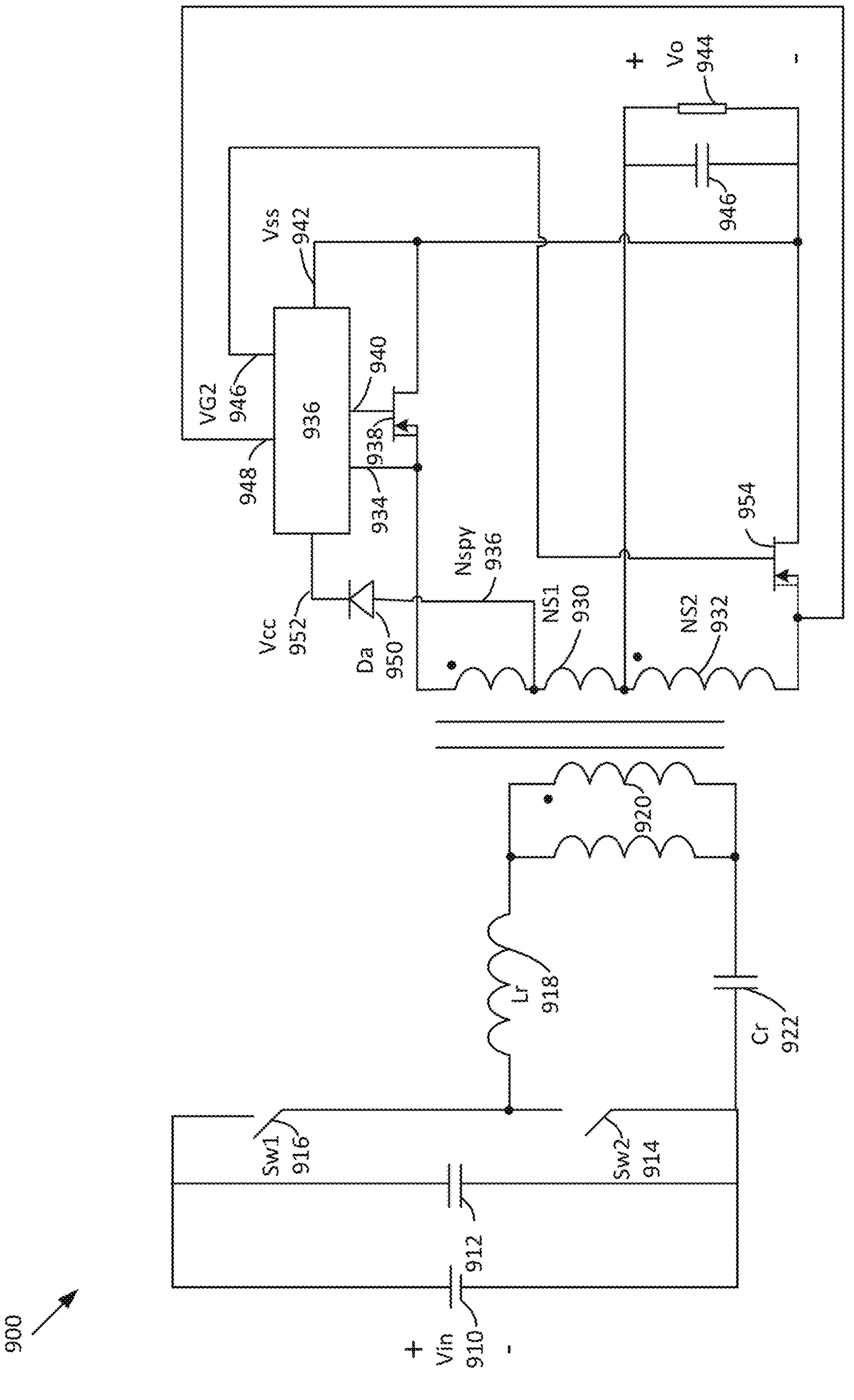
FIG. 9 is a schematic diagram of a full bridge LLC converter with a synchronous rectifier controller powered by a portion of a secondary winding.

FIG. 9 is a simplified schematic diagram of a full bridge LLC converter 900, according to embodiments of the disclosure. Converter circuit 900 may be or include any of the components, features, or characteristics of any of the rectifier circuits described herein. As shown in FIG. 9, converter circuit 900 has a voltage input Vin 910 with a plus rail and a minus rail in parallel with an input capacitance 912. The top of switch Sw1 916 is connected to the plus rail of Vin 910. The bottom of switch 916 is connected to one side of inductor Lr 918 and is also connected to the top of switch 914. The bottom of switch Sw2 914 is connected to the negative rail of Vin 910 and to one side of capacitor 922. The other side of inductor L 918 is connected to the top of primary winding 920. The bottom of primary winding 920 is connected to the other side of capacitor Cr 922. The transformer has two secondaries, a first secondary NS1 930 and a second secondary NS2 932. The first secondary has a tapped output 936 connected to the secondary 930 a reduced number of windings Nto form the end. The top of the first secondary Ns1 930 is connected to Vd1 934 of the SRCC 936 and is also connected to the source of synchronous switch 938. The synchronous switch 938 is controlled by the first gate drive Vg1 940 of the Synchronous Rectifier Controller 936. The drain of synchronous switch 938 is connected to Vss 942 of the SRCC and is connected to the minus rail of the output voltage Vo 944 and capacitor 946. The bottom of the first secondary 930 is connected to the top of the second secondary 932 and is connected to the plus rail of the output Vo 944 and the plus side of the output capacitance 946. The bottom of the second secondary Ns2 932 is connected to the Vd2 948 input of the SRCC 936 and is also connected the source of synchronous switch 954. The synchronous switch 954 is controlled by the VG2 946 output of the Synchronous Rectifier Controller 936. The drain of synchronous switch 948 is connected to the negative rail Vo 944 and the capacitor 946 as well as the Vss 942 of the Synchronous Rectifier Controller.

The converter circuit 900 operates such that switch 916 closes so that Vin 910 charges the inductor Lr 918 in series with the primary winding 920 and the capacitor Cr 922. The voltage on the secondaries 930 and 932 is the same phase of the voltage on the primary 920. When the voltage on the secondary 930 is positive the diode Da 950 is reverse biased. When the secondary NS2 932 is positive switch SR2 948 closes and Vo 944 is driven by the second secondary Ns2 932. When the switch SW1 916 opens switch Sw2 914 is closed so that the resonant current can circulate through the inductor Lr 918 the winding 920 and the capacitor Cr 922. When the voltage across the primary is negative the output of the secondary is negative. The synchronous switch 938 is closed and synchronous switch 954 is open. The first secondary drives the output voltage 944. The synchronous switch cross-connects the output voltage Vo 944 so that the negative output voltage of the first secondary is reversed. The output voltage Vo 944 is positive when the output of the first secondary is negative. Vo 944 is a full wave rectified output of the two secondaries. When the first secondary is negative diode Da 950 is forward biased and produces a half wave rectified Vcc 952 derived from the tap 936 voltage.

For simplicity, various peripheral components, such as decoupling capacitors and other electronic components of the power conversion circuits are not shown in the figures.

In the foregoing specification, embodiments of the disclosure have been described with reference to numerous specific details that can vary from implementation to implementation. The specification and drawings are, accordingly, to be regarded in an illustrative rather than a restrictive sense. The sole and exclusive indicator of the scope of the disclosure, and what is intended by the applicants to be the scope of the disclosure, is the literal and equivalent scope of the set of claims that issue from this application, in the specific form in which such claims issue, including any subsequent correction. The specific details of particular embodiments can be combined in any suitable manner without departing from the spirit and scope of embodiments of the disclosure.

Additionally, spatially relative terms, such as "bottom or "top" and the like can be used to describe an element and/or feature's relationship to another element(s) and/or feature(s) as, for example, illustrated in the figures. It will be understood that the spatially relative terms are intended to encompass different orientations of the device in use and/or operation in addition to the orientation depicted in the figures. For example, if the device in the figures is turned over, elements described as a "bottom" surface can then be oriented "above" other elements or features. The device can be otherwise oriented (e.g., rotated 90 degrees or at other orientations) and the spatially relative descriptors used herein interpreted accordingly.

Terms "and," "or," and "an/or," as used herein, may include a variety of meanings that also is expected to depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, B, C, AB, AC, BC, AA, AAB, ABC, AABBCCC, etc.

Reference throughout this specification to "one example," "an example," "certain examples," or "exemplary implementation" means that a particular feature, structure, or characteristic described in connection with the feature and/or example may be included in at least one feature and/or example of claimed subject matter. Thus, the appearances of the phrase "in one example," "an example," "in certain examples," "in certain implementations," or other like phrases in various places throughout this specification are not necessarily all referring to the same feature, example, and/or limitation. Furthermore, the particular features, structures, or characteristics may be combined in one or more examples and/or features.

In some implementations, operations or processing may involve physical manipulation of physical quantities. Typically, although not necessarily, such quantities may take the form of electrical or magnetic signals capable of being stored, transferred, combined, compared, or otherwise manipulated. It has proven convenient at times, principally for reasons of common usage, to refer to such signals as bits, data, values, elements, symbols, characters, terms, numbers, numerals, or the like. It should be understood, however, that all of these or similar terms are to be associated with appropriate physical quantities and are merely convenient labels. Unless specifically stated otherwise, as apparent from the discussion herein, it is appreciated that throughout this specification discussions utilizing terms such as "processing," "computing," "calculating," "determining," or the like refer to actions or processes of a specific apparatus, such as a special purpose computer, special purpose computing apparatus or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

In the preceding detailed description, numerous specific details have been set forth to provide a thorough understanding of claimed subject matter. However, it will be understood by those skilled in the art that claimed subject matter may be practiced without these specific details. In other instances, methods and apparatuses that would be known by one of ordinary skill have not been described in detail so as not to obscure claimed subject matter. Therefore, it is intended that claimed subject matter not be limited to the particular examples disclosed, but that such claimed subject matter may also include all aspects falling within the scope of appended claims, and equivalents thereof.

What is claimed is:

1. A power conversion circuit comprising:

a transformer having a primary winding coupled to a secondary winding, wherein the primary winding is arranged to receive AC power from a power source and wherein the secondary winding is arranged to transfer power to a load, the secondary winding extending between a first terminal and a second terminal and including a tapped output disposed between the first and second terminals;

a synchronous switch having a source terminal, a gate terminal and a drain terminal, the synchronous switch disposed between the secondary winding and the load, wherein the source terminal is directly connected to the first terminal;

a controller arranged to operate the synchronous switch to rectify the power transferred to the load, wherein the controller is powered exclusively from a portion of the secondary winding between the tapped output and the second terminal without requiring an auxiliary winding, and wherein the portion of the secondary winding between the tapped output and the second terminal includes fewer turns than a total number of turns of the secondary winding; and wherein the controller is directly connected to the first terminal.

2. The power conversion circuit of claim 1, wherein the synchronous switch is formed from gallium nitride.

3. The power conversion circuit of claim 1, wherein the controller is formed from silicon.

4. The power conversion circuit of claim 1, wherein the synchronous switch and the controller are formed from gallium nitride and are monolithically formed on a single die, and wherein the controller includes integrated power management circuitry configured to regulate power received from the portion of the secondary winding without external power regulation components.

5. The power conversion circuit of claim 1 further comprising a diode positioned between the tapped output and the controller.

6. The power conversion circuit of claim 1, wherein the tapped output includes a fraction of a number of secondary winding turns.

7. A power conversion circuit comprising:

a transformer having a primary winding arranged to receive power from a power source, a secondary winding arranged to transfer power to a load, and a tapped output arranged to transfer power to a controller circuit, wherein the secondary winding includes N turns between a first terminal and a second terminal and wherein the tapped output is formed from a portion of the secondary winding, the tapped output including M turns between the first terminal and the tapped output, where M is less than N;

a synchronous switch having a source terminal, a gate terminal and a drain terminal, the synchronous switch disposed between the secondary winding and the load, wherein the source terminal is directly connected to the first terminal; and a controller circuit arranged to operate the synchronous switch to rectify the power transferred to the load, wherein the controller circuit is powered exclusively from a portion of the secondary winding between the tapped output and the second terminal without requiring an auxiliary winding; and wherein the controller circuit is directly connected to the first terminal.

8. The power conversion circuit of claim 7, wherein the synchronous switch is formed from gallium nitride.

9. The power conversion circuit of claim 7, wherein the controller circuit is formed from silicon.

10. The power conversion circuit of claim 7, wherein the synchronous switch and the controller circuit are formed from gallium nitride and are monolithically formed on a single die, and wherein the controller circuit includes integrated power management circuitry configured to regulate power received from the portion of the secondary winding without external power regulation components.

11. The power conversion circuit of claim 7 further comprising a diode positioned between the tapped output and the controller circuit.

12. A method of operating a rectification circuit, the method comprising:

receiving AC power at a primary winding of a transformer;

coupling power from the primary winding of the transformer to a secondary winding of the transformer, the secondary winding extending between a first terminal and a second terminal; and rectifying power received from the secondary winding with a switch and transferring DC power to a load, wherein the switch includes a source terminal, a gate terminal and a drain terminal and wherein the switch is operated by a controller that is powered exclusively from a portion of the secondary winding between a tapped output and the second terminal without requiring an auxiliary winding; and wherein the source terminal is directly connected to the first terminal; and wherein the controller is directly connected to the first terminal.

13. The method of claim 12, wherein the controller receives power from a tapped output of the secondary winding, wherein the secondary winding includes N turns between a first terminal and a second terminal and wherein the tapped output includes M turns between the first terminal and the tapped output, where M is less than N.

14. The method of claim 13 further comprising a diode positioned between the tapped output and the controller, the diode arranged to rectify power transferred to the controller.

15. The method of claim 12, wherein the switch is formed from gallium nitride.

16. The method of claim 12, wherein the controller is formed from silicon.

17. The method of claim 12, wherein the switch and the controller are formed from gallium nitride and are monolithically formed on a single die, and wherein the controller includes integrated power management circuitry that regulates power received from the portion of the secondary winding without external power regulation components.

18. The method of claim 12, wherein the switch and the controller are co-packaged in a single electronic package.

* * * * *